(12) United States Patent
O'Neill et al.

(10) Patent No.: US 8,875,116 B2
(45) Date of Patent: Oct. 28, 2014

(54) NETWORK FOR UPDATING FIRMWARE AND / OR SOFTWARE IN WIRELESS COMMUNICATION DEVICES

(75) Inventors: Patrick O'Neill, Dana Point, CA (US); Patrick C. Lilley, Irvine, CA (US); Bindu Rama Rao, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1169 days.

(21) Appl. No.: 12/636,600

(22) Filed: Dec. 11, 2009

(65) Prior Publication Data

US 2010/0095293 A1    Apr. 15, 2010

Related U.S. Application Data

(63) Continuation of application No. 10/631,567, filed on Jul. 31, 2003, now abandoned, and a continuation-in-part of application No. 10/311,462, filed as application No. PCT/US01/44034 on Nov. 19, 2001, now abandoned.

(60) Provisional application No. 60/249,606, filed on Nov. 17, 2000, provisional application No. 60/401,054, filed on Aug. 5, 2002, provisional application No. 60/412,850, filed on Sep. 23, 2002.

(51) Int. Cl.
    *G06F 9/44* (2006.01)
    *G06F 9/445* (2006.01)

(52) U.S. Cl.
    CPC ...... *G06F 8/65* (2013.01); *G06F 8/665* (2013.01); *G06F 8/68* (2013.01)
    USPC ............ 717/168; 717/170; 717/171; 717/173

(58) Field of Classification Search
    None
    See application file for complete search history.

(56) References Cited

U.S. PATENT DOCUMENTS

| 4,337,376 | A | 6/1982  | Gruenberg |
| 5,261,055 | A | 11/1993 | Moran     |
| 5,392,353 | A | 2/1995  | Morales   |
| 5,442,771 | A | 8/1995  | Filepp    |
| 5,479,637 | A | 12/1995 | Lisimaque |
| 5,579,522 | A | 11/1996 | Christeson |

(Continued)

FOREIGN PATENT DOCUMENTS

| CA | 2339923    |    | 3/2000 |
| CA | 2339923 A1 |    | 3/2000 |

(Continued)

OTHER PUBLICATIONS

Document Reference Citation: Patent information; Published Serial No. 556094, 3 pages, Jan. 3, 2008.

*Primary Examiner* — Qamrun Nahar

(57) ABSTRACT

One or more methods and systems of updating software in wireless communication devices are presented. In one embodiment, software updates are generated by a generation environment and distributed by a distribution environment. One or more wireless communication devices receive one or more software updates from the distribution environment. In one embodiment, software updates are generated from processing performed at a pre-processing device such as a cable television set-top-box or a server of the distribution environment. A software processing package, provided by the generation environment, is used to generate such software updates for the one or more wireless communication device. One or more methods of provisioning and billing wireless communication devices are also presented.

27 Claims, 10 Drawing Sheets

(56) References Cited

U.S. PATENT DOCUMENTS

| | | |
|---|---|---|
| 5,596,738 A | 1/1997 | Pope |
| 5,598,534 A | 1/1997 | Haas |
| 5,608,910 A | 3/1997 | Shimakura |
| 5,623,604 A | 4/1997 | Russell |
| 5,666,293 A | 9/1997 | Metz |
| 5,677,708 A | 10/1997 | Matthews, III et al. |
| 5,727,202 A | 3/1998 | Kucala |
| 5,729,735 A | 3/1998 | Meyering |
| 5,752,039 A | 5/1998 | Tanimura |
| 5,778,440 A | 7/1998 | Yiu |
| 5,790,974 A | 8/1998 | Tognazzini |
| 5,878,256 A | 3/1999 | Bealkowski |
| 5,960,445 A | 9/1999 | Tamori |
| 6,009,497 A | 12/1999 | Wells |
| 6,038,636 A | 3/2000 | Brown |
| 6,064,814 A | 5/2000 | Capriles |
| 6,073,206 A | 6/2000 | Piwonka |
| 6,073,214 A | 6/2000 | Fawcett |
| 6,088,759 A | 7/2000 | Hasbun |
| 6,097,942 A | 8/2000 | Laiho |
| 6,105,063 A | 8/2000 | Hayes |
| 6,112,024 A | 8/2000 | Almond et al. |
| 6,112,197 A | 8/2000 | Chatterjee |
| 6,126,327 A | 10/2000 | Bi |
| 6,128,695 A | 10/2000 | Estakhri |
| 6,157,559 A | 12/2000 | Yoo |
| 6,163,274 A | 12/2000 | Lindgren |
| 6,198,946 B1 | 3/2001 | Shin et al. |
| 6,262,973 B1 | 7/2001 | Shiraishi et al. |
| 6,279,153 B1 | 8/2001 | Bi et al. |
| 6,311,322 B1 | 10/2001 | Ikeda et al. |
| 6,360,366 B1 | 3/2002 | Heath et al. |
| 6,366,584 B1 | 4/2002 | Gulliford et al. |
| 6,393,585 B1 | 5/2002 | Houha et al. |
| 6,438,585 B2 | 8/2002 | Mousseau et al. |
| 6,496,978 B1 * | 12/2002 | Ito .................. 717/170 |
| 6,687,901 B1 * | 2/2004 | Imamatsu ................. 717/173 |
| 6,731,932 B1 | 5/2004 | Rune et al. |
| 6,757,263 B1 | 6/2004 | Olds |
| 6,775,267 B1 | 8/2004 | Kung et al. |
| 6,820,214 B1 | 11/2004 | Cabrera et al. |
| 6,948,099 B1 | 9/2005 | Tallam |
| 7,061,891 B1 | 6/2006 | Kilfoyle et al. |
| 7,069,578 B1 * | 6/2006 | Prus et al. ................. 725/132 |
| 7,099,896 B2 | 8/2006 | Fields et al. |
| 7,181,731 B2 | 2/2007 | Pace et al. |
| 7,313,791 B1 | 12/2007 | Chen et al. |
| 2001/0029178 A1 | 10/2001 | Criss |
| 2001/0047363 A1 | 11/2001 | Peng |
| 2001/0048728 A1 | 12/2001 | Peng |
| 2002/0078209 A1 | 6/2002 | Peng |
| 2002/0116261 A1 | 8/2002 | Moskowitz |
| 2002/0131404 A1 | 9/2002 | Mehta |
| 2002/0152005 A1 | 10/2002 | Bagnordi |
| 2002/0156863 A1 | 10/2002 | Peng |
| 2002/0157090 A1 | 10/2002 | Anton, Jr. |
| 2003/0033599 A1 | 2/2003 | Rajaram |
| 2003/0037075 A1 | 2/2003 | Hannigan |
| 2003/0061384 A1 | 3/2003 | Nakatani |
| 2003/0196110 A1 | 10/2003 | Lampson et al. |
| 2003/0214919 A1 | 11/2003 | Kilfoyle et al. |

FOREIGN PATENT DOCUMENTS

| | | |
|---|---|---|
| JP | 08-202626 | 8/1996 |
| JP | 8202626 | 8/1996 |
| KR | 2002-034228 | 5/2000 |
| KR | 20020034228 | 5/2000 |
| KR | 20010100328 | 11/2001 |
| TW | 090107418 | 1/2003 |
| TW | 556094-(B) | 10/2003 |

\* cited by examiner

NETWORK FOR UPDATING FIRMWARE AND / OR SOFTWARE IN WIRELESS COMMUNICATION DEVICES

CROSS REFERENCE TO RELATED APPLICATIONS

This is a continuation of U.S. patent application Ser. No. 10/631,567 entitled "Network for Updating Firmware and/or Software in Wireless Communication Devices," filed Jul. 31, 2003.

This application is a continuation-in-part of U.S. patent application Ser. No. 10/311,462, "System and Method for Updating and Distributing Information", filed Dec. 13, 2002, which is the National Stage filing of PCT Application Ser. No. PCT/US01/44034, "System and Method for Updating and Distributing Information", filed Nov. 19, 2001, which claims priority to U.S. Provisional Patent Application Ser. No. 60/249,606, filed Nov. 17, 2000, the complete subject matter of each of which is incorporated herein by reference in its entirety.

This application makes reference to and claims priority based on the following provisional applications, the complete subject matter of each of which is incorporated herein by reference in its entirety.

| Ser. No. | Docket No. | Title | Filed | Inventors |
|---|---|---|---|---|
| 60/412,850 | 14117US01 | A Set-Top-Box Based Network For Updating Firmware/Software | Sep. 23, 2002 | Rao, Lilley |
| 60/401,054 | 14120US01 | A Network For Updating Firmware | Aug. 5, 2002 | O'Neill, Lilley, Rao |

FEDERALLY SPONSORED RESEARCH OR DEVELOPMENT

Not Applicable

MICROFICHE/COPYRIGHT REFERENCE

Not Applicable

BACKGROUND OF THE INVENTION

Wireless communication devices, such as mobile phones, wireless personal digital assistants (PDA's), and wireless PCs have become indispensable tools as the number of features and functions they provide increases. In order to implement these features and functions, the wireless communication devices contain firmware and software provided by device manufacturers, telecommunication carriers, or other third party manufacturers.

As technology continues to evolve, a manufacturer of such devices will find it imperative to update these devices with revised firmware and application software that enables a number of new features and functions. Often, the firmware and application software contain software bugs. New versions of the firmware and software are periodically released to fix the bugs or to introduce new features, or both.

However, there are a number of issues that arise when new releases of firmware and software are incorporated. Wireless communication devices are often constrained in terms of resources, such as available memory. Attempts to upgrade firmware or software by end-users often result in making the wireless communication device inoperable. In addition, attempts to upgrade firmware and/or software are often constrained by slow download speeds. Further, download times may be lengthy, inhibiting operational use of these wireless communication devices. In addition, determination of the version of firmware or application software that is currently being executed on the wireless communication device is not an easy task, especially if performed by an end-user.

Typically, a carrier supports the use of a variety of wireless communication devices from a plurality of manufacturers on the carrier's network. Without incorporating additional signaling information in the transmission protocol, a carrier may not be able to determine the make and model of the wireless communication device currently being used by an end-user on the carrier's network. As a consequence, an appropriate update package cannot be prescribed.

Given a particular make and model of wireless communication device, it also becomes necessary to determine the software version required. In many instances, it is not convenient to determine how a firmware or application software has changed between versions. One possible approach to providing a firmware and/or software update is to just ship the entire new version of firmware or software to a wireless communication device. However, the wireless communication device may not have sufficient free memory space to receive such packages of firmware or software. In addition, additional memory space may be needed in the processing and incorporation of such firmware and software. Furthermore, the time required for transferring a complete version of firmware or software to an electronic device from a carrier may pose a significant inconvenience to an end-user.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

One or more systems and methods are disclosed to provide software updates to one or more wireless communication devices. The systems and methods described facilitate efficient and effective updating of firmware and/or software resident in the one or more wireless communication devices.

In one embodiment, the system comprises a generation environment, a distribution environment, and a wireless communication device. The wireless communication device comprises a primary update environment that facilitates the acquisition of relevant software updates.

In one embodiment, the system comprises a generation environment, a distribution environment, a pre-processing device, and a wireless communication device. The wireless communication device and pre-processing device comprises respectively, a primary update environment and a secondary update environment that facilitate the acquisition of relevant software updates.

In one embodiment, the method comprises distributing a software update to a wireless communication device. The wireless communication device incorporates the software update by way of its primary update environment. A distribution environment provides a suitable distribution node, by which software updates may be efficiently distributed to the wireless communication device.

In one embodiment, the method comprises distributing a software processing package to a distribution environment and/or pre-processing device. Software updates are generated by executing the software processing package, optionally incorporating portions of existing software resident in the wireless communication device to be updated. Subsequently, the software update is transmitted to and incorporated by the wireless communication device.

In one embodiment, a method of distributing software updates comprises a pre-processing device such as a set-top-box that efficiently distributes software updates to a plurality of like wireless communication devices. The transmission occurs over a local area air interface to all wireless communication devices requiring a similar software update. In a related embodiment, a method comprises a wireless communication device that transmits software updates to all wireless communication devices in its communication range that require the software update.

In one embodiment, a method of provisioning and/or billing a wireless communication device is provided. Subscriber identification information is transmitted to a carrier when a subscriber elects to subscribe to one or more services associated with one or more applications downloaded by way of a software update. The subscriber identification information is utilized in the provision and/or billing process.

These and other advantages, aspects, and novel features of the present invention, as well as details of illustrated embodiments, thereof, will be more fully understood from the following description and drawings.

DETAILED DESCRIPTION OF THE INVENTION

Aspects of the present invention may be found in a system and method to effectively and efficiently distribute software updates to one or more wireless communication devices. A distribution environment provides a processing, storage, and distribution network for distributing software to one or more wireless communication devices. The distribution environment may comprise one or more network nodes from which software may be downloaded. The network nodes may comprise one or more servers capable of storing and transmitting software to one or more wireless communication devices. In addition, aspects of the present invention provide a system and method to distribute software updates to one or more wireless communication devices by way of software processing packages transmitted to a pre-processing device such as a cable TV set-top-box. The exemplary set-top-box processes the software processing packages to generate software updates that may be downloaded onto one or more wireless communication devices.

The term "software" used herein is intended to include not only software, but also or alternatively firmware. The terms "software update" or "update package" used herein is defined as software that may be executed by a wireless communication device for updating its software. The term "software processing package" used herein is defined as software used in a distribution environment, pre-processing device such as a set-top-box used in cable networks, or device other than a wireless communication device that processes and generates software updates for use by the wireless communication device.

Figure 1:
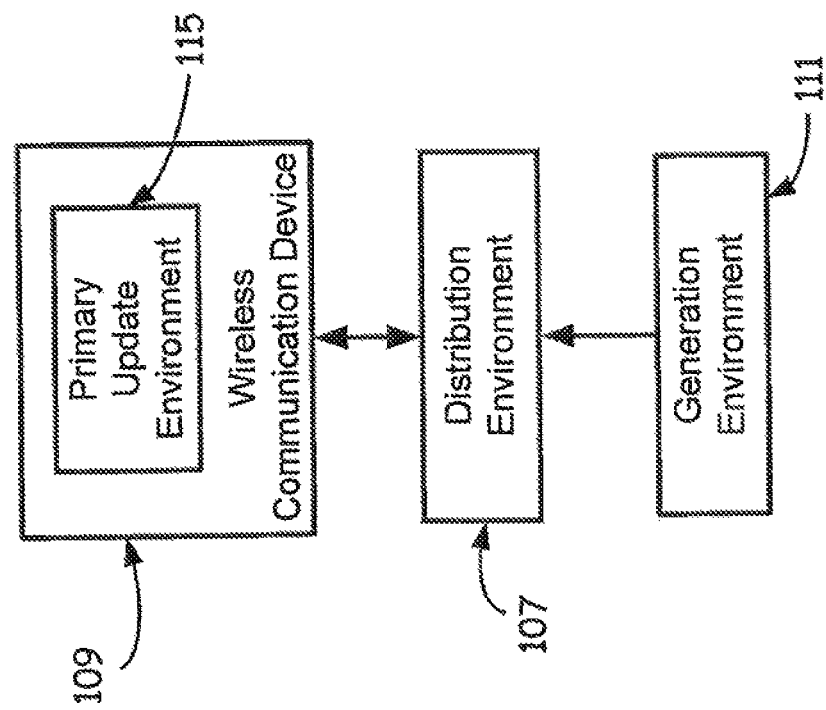
FIG. 1 is a block diagram of a system for updating software in a wireless communication device in accordance with an embodiment of the invention.

FIG. 1 is a block diagram of a system for updating software in accordance with an embodiment of the invention. The system comprises a wireless communication device 109, a distribution environment 107, and a generation environment 111. The distribution environment 107 provides one or more software updates to the wireless communication device 109 by way of one or more transmission media. The distribution environment 107 may comprise any combination of hardware and/or software capable of communication and data transmission over one or more wireless or wireline networks. Typical wireless networks include 802.11, Bluetooth, CDMA, TDMA, GSM, and the like. Typical wireline networks include cable, dedicated line, DSL, and the like. The wireless communication device 109 is capable of updating its software with the assistance of a primary update environment 115 contained within the wireless communication device 109. The primary update environment 115 downloads one or more software updates or update packages from the distribution environment 107. The software updates or update packages may comprise one or more instruction sets and data used in updating the software resident in the wireless communication device 109. The generation environment 111 generates software such as software updates for storage at the distribution environment 107. The generation environment 111 may comprise one or more computing devices and application software capable of generating one or more software updates for one or more types of wireless communication devices 109. The distribution environment 107 comprises a network such as a client server network or the like that is capable of storing and transmitting software updates to one or more wireless communication devices 109. In one embodiment, the network comprises an exemplary server connected to multiple network to network interfaces and user to network interfaces. The server may control the storage and transmission of software updates stored in a storage device within the distribution environment 107. The distribution environment 107 may store software updates in one or more storage devices such as hard drives, optical disks, magnetic disks, and the like. The server may be owned and operated by a network carrier or a manufacturer. In one embodiment, the distribution environment 107 comprises a cable TV network incorporating pre-processing devices such as set-top-boxes that facilitate transmission of appropriate software updates to a wireless communication device 109. Although not illustrated, in one embodiment, the distribution environment may include the generation environment.

Figure 2:
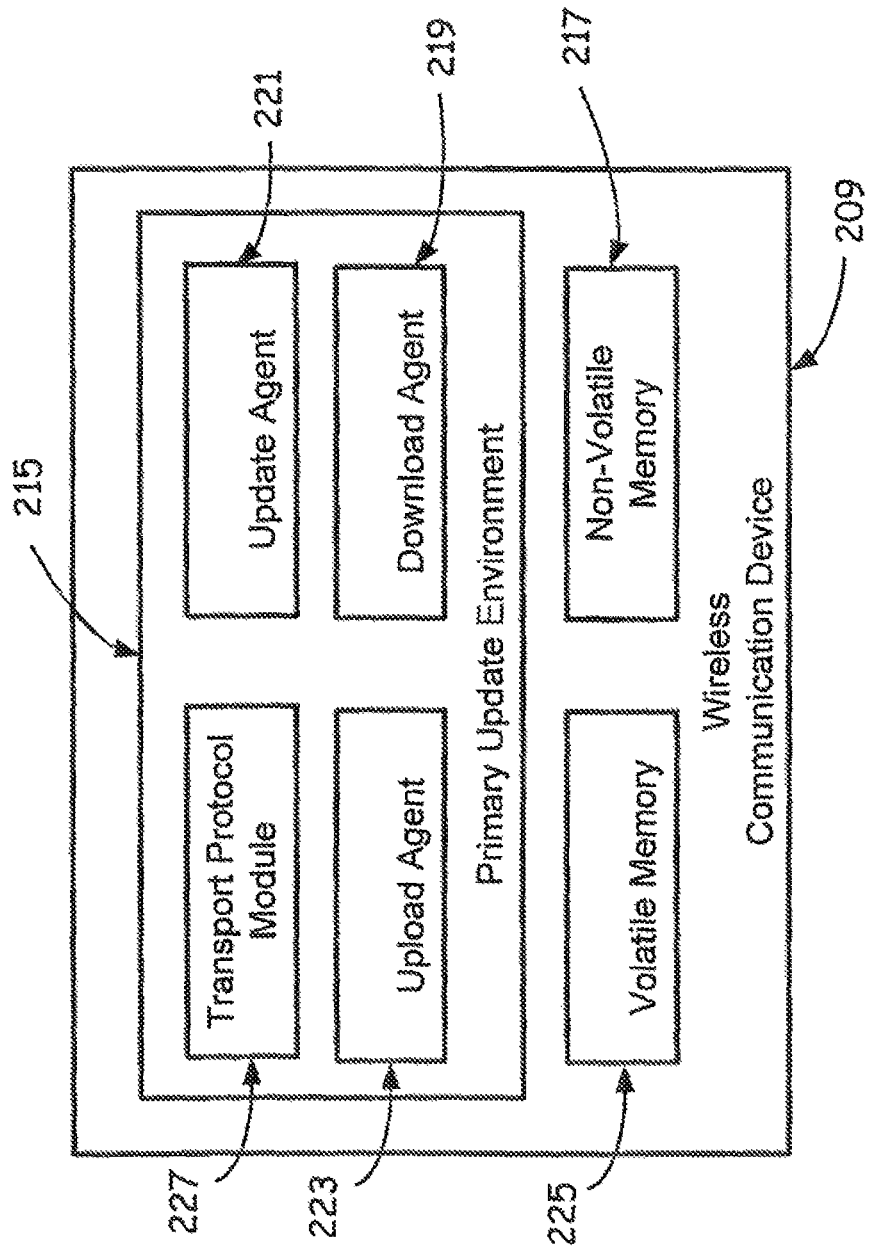
FIG. 2 is a block diagram of a subsystem for updating software in a wireless communication device in accordance with an embodiment of the invention.

FIG. 2 is a system diagram of a wireless communication device 209 in accordance with an embodiment of the invention. The wireless communication device 209 comprises a primary update environment 215, a non-volatile memory 217, and a volatile memory 225. The primary update environment 215 comprises a download agent 219, an update agent 221, an upload agent 223, and a transport protocol module 227. The download agent 219 facilitates the download and incorporation of software from a distribution environment while the upload agent 223 uploads software or a subset of software resident in the wireless communication device 209, such as one or more software modules resident in non-volatile memory 217 of the wireless communication device 209, to accommodate incorporation of one or more software updates from the distribution environment. In one embodiment, the upload agent 223 uploads software from the non-volatile or volatile memories 217, 225 of one or more wireless communication devices 209 into one or more storage devices in the distribution environment. In this example, the distribution environment may generate appropriate software updates by processing the uploaded software to generate one or more suitable software updates for the one or more wireless communication devices 209. After processing is completed, the distribution environment may subsequently download the one or more software updates back into the one or more wireless communication devices 209. In addition to being able to initiate a software update, it is contemplated that the wireless communication device 209 may be able to automatically initiate an update of any application, driver, and other necessary software required for proper operation of the wireless communication device 209. The non-volatile and volatile memories 217, 225 function to store and run one or more software programs for operation of the wireless communication device 209. The download, update, and upload agents 219, 221, 223 and transport protocol module 227 may comprise hardware and/or software configured to perform the previously described processes or operations. In one embodiment, the wireless communication device 209 incorporates a user interface in which a user inputs requests for software updates. The user interface may comprise a keypad, LCD touch screen, voice recognition system, or the like. It is contemplated that the user may input one or more parameters that specifies or automates the process of downloading a particular software update.

In one embodiment, the primary update environment is capable of successfully completing the software update process in the wireless communication device despite interruptions to an earlier attempt to update the software of the wireless communication device. For example, the wireless communication device downloads a software module from the distribution environment, and when interrupted, stores any downloaded portion of software into volatile or non-volatile memories. A continuation of the download commences at a point in the software where the interruption occurred. As a result, the downloading process becomes more efficient. Such interruptions may be caused by a loss of connectivity or a loss of power in the wireless communication device during a download. In one embodiment, the download agent monitors the portion of software update (or update package) downloaded into non-volatile or volatile memory. If communication with the distribution environment is lost, the partially downloaded software update is saved. A subsequent attempt to download the same software update would automatically determine the portion of the software update not yet downloaded and initiate downloading of the remaining portion only. In one embodiment, the wireless communication device enters a deferred mode or state. It is contemplated that the deferred mode occurs when the wireless communication device is involved with other operations requiring the use of the non-volatile or volatile memory. The deferred mode may occur, for example, when a particular feature or function of the wireless communication device is used.

Software updates downloaded by the primary update environment of a wireless communication device may occur by way of one of many transport media. These data transport media may include wide area and local area wireless or wireline networks. It is contemplated that exemplary wireless local area network protocols such as 802.11 or Bluetooth are used.

It is contemplated that a distribution environment receives software updates electronically (via ftp, http, or other like communication protocols) from a generation environment such as a manufacturer's software update generation system. In other instances, the software updates provided by the generation environment are transported to the distribution environment using portable media such as a CDROM or a DVD. In general, software updates are stored at the distribution environment or at a pre-processing device (to be discussed later) until required by one or more wireless communication devices.

In one embodiment, a wireless communication device verifies and validates the integrity of a software update prior to its incorporation. It is contemplated that such verification comprises a verification of downloaded software updates by way of authentication algorithms such as CRC checks, hash value computations and comparisons, and/or digital signature verifications. In one embodiment, the wireless communication device may determine that the software update is unsuitable for one or more reasons. In such an instance, the software resident in the wireless communication device is not modified in any way. In one embodiment, an update agent of a primary update environment of the wireless communication device verifies that a particular software update is retrieved from the proper pre-processing device and/or distribution environment. In one embodiment, a download agent of a primary update environment of a wireless communication device verifies that the software update originated from a manufacturer of the wireless communication device.

It is contemplated that a download agent of a wireless communication device may periodically communicate to a distribution environment in order to determine availability of software updates. It is further contemplated that a device such as a server in the distribution environment may notify the wireless communication device when a new software update becomes available. The wireless communication device may communicate the type make and model) of software it uses. In one embodiment, a user of the wireless communication device may specify the frequency of an update check between the distribution environment and the wireless communication device. In one embodiment, the content of the communication comprises a software version identifier such, as a software manufacturer's identification number, a model identification number, and operating system identification number, and a software version number. Other parameters such as wireless communication device information may also be included in the communication. Information such as device make, model, total memory size, and available memory space of the wireless communication device may be transmitted. It is contemplated that an exemplary server and a storage device within the distribution environment processes the transmitted information to determine the availability of relevant software updates preferable for downloading to the wireless communication device. The exemplary server may transmit a response indicating the availability of software updates. When the wireless communication device receives the response, it may initiate a download of the appropriate software updates from the distribution environment. The appropriate software updates may be generated by way of software processing packages that are processed at the distribution environment or at another pre-processing device such as an exemplary set-top-box (as will be described later). The software processing package may incorporate portions of existing software provided by one or more wireless communication devices during processing. The software updates may be downloaded and easily executed using one or more update, download, and upload agents of the primary update environment in conjunction with one or more software applications, components, and/or firmware resident in memory of the wireless communication device. It is contemplated that any software processing packages are generated by software and/or hardware at a generation environment and subsequently processed at a distribution environment or a pre-processing environment such as an exemplary cable TV set-top-box. In one embodiment, the software and/or hardware is termed a "generator".

In one embodiment, a difference value is calculated between a version number of a software version used in a wireless communication device and a version number corresponding to a latest software version. In one embodiment, the version number of a software resident in a wireless communication device may be determined by downloading and analyzing the associated software image. Given the version number of the latest software version available, a numeric difference value may be calculated. This difference value is used to determine an appropriate software update for the wireless communication device. It is contemplated that a computing device within the distribution environment, for example, calculates the difference. The difference is mapped to a particular software update using a database resident in the distribution environment. The various update, upload, download agents and transport protocol module of a primary update environment facilitate the retrieval of an appropriate software update and its subsequent download and incorporation into the wireless communication device. At the end of the download, the wireless communication device may validate the software update by employing one or more authentication algorithms, validation routines, and diagnostics such as CRC checks.

In one embodiment, a device such as a server within a distribution environment transmits the latest available software update to a wireless communication in the event no software version number is received from a wireless communication device. For example, if several versions of updates are available, the latest version of all available software updates is transmitted to the wireless communication device when an update request is made. As a result, the wireless communication device is updated using the latest available software update.

In one embodiment, a distribution environment sends a periodic software update notification to one or more wireless communication devices regarding the availability of software updates. The notifications may be specific to one or more types of wireless communication devices. The wireless communication devices may respond to the notification by initiating a download of a software update from the distribution environment. In order to process the software update, the wireless communication device may update one or more necessary applications, drivers and other software required for proper downloading and operation of the wireless communication device.

Figure 3A:
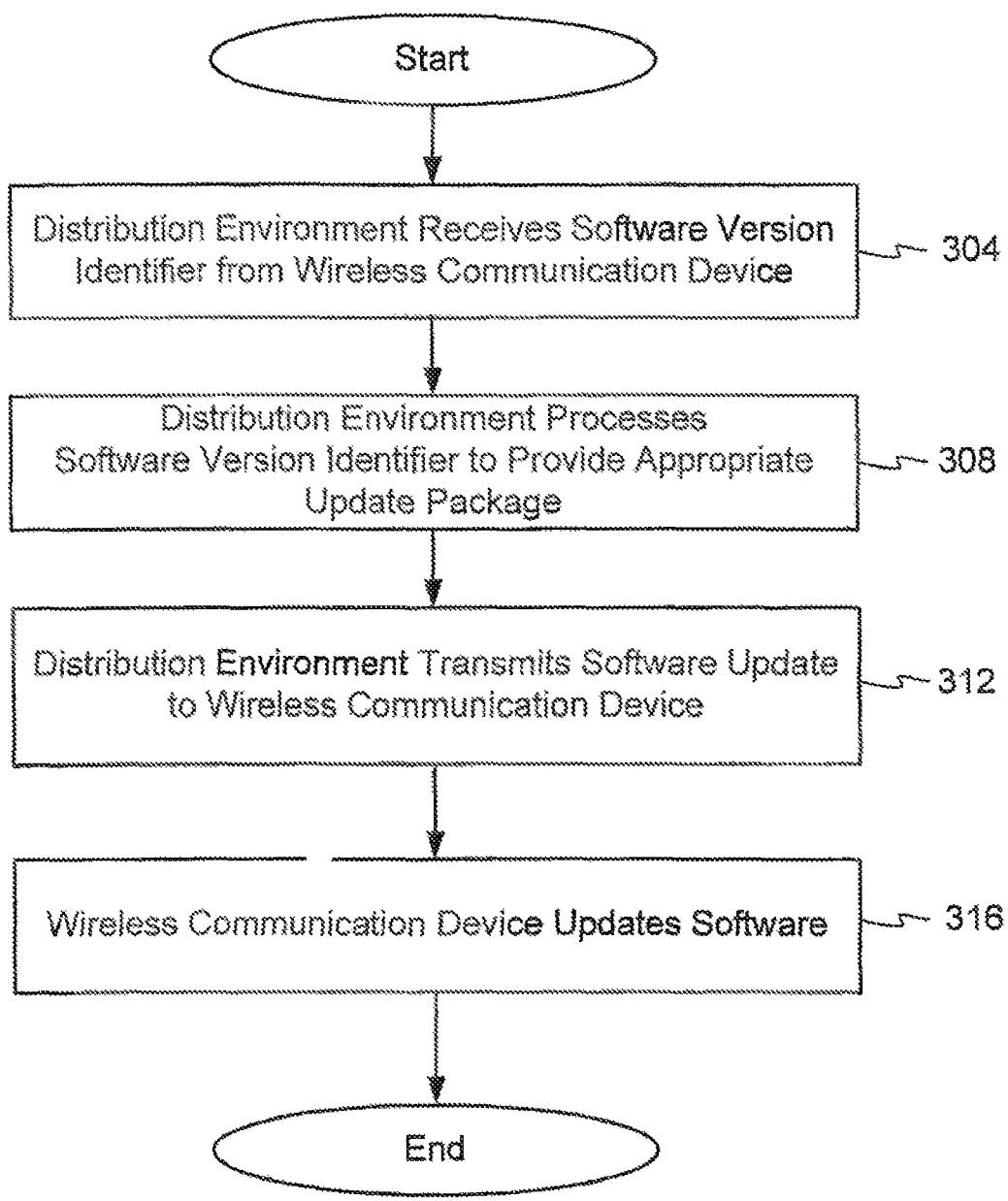
FIG. 3a is an operational flow diagram illustrating a method for updating software in a wireless communication device in accordance with an embodiment of the invention.

FIG. 3a is an operational flow diagram illustrating a method of updating software in a wireless communication device. At step 304, a distribution environment receives a software version identifier from a wireless communication device. The software version identifier may be transmitted by the wireless communication device in response to a periodic request made by an exemplary server within the distribution environment. In other instances, a user of the wireless communication device may initiate transfer of the software version identifier. At step 308, the distribution environment processes the software version identifier to provide an appropriate software update for subsequent download to the wireless communication device. Typically, a generation environment generates the appropriate software update for subsequent storage and distribution at the distribution environment. At step 312, the distribution environment transmits the appropriate software update to the wireless communication device. And at step 316, the wireless communication device incorporates the desired software update into the existing software of the wireless communication device. Download, update, or upload agents are utilized as required by the wireless communication device.

Figure 3B:
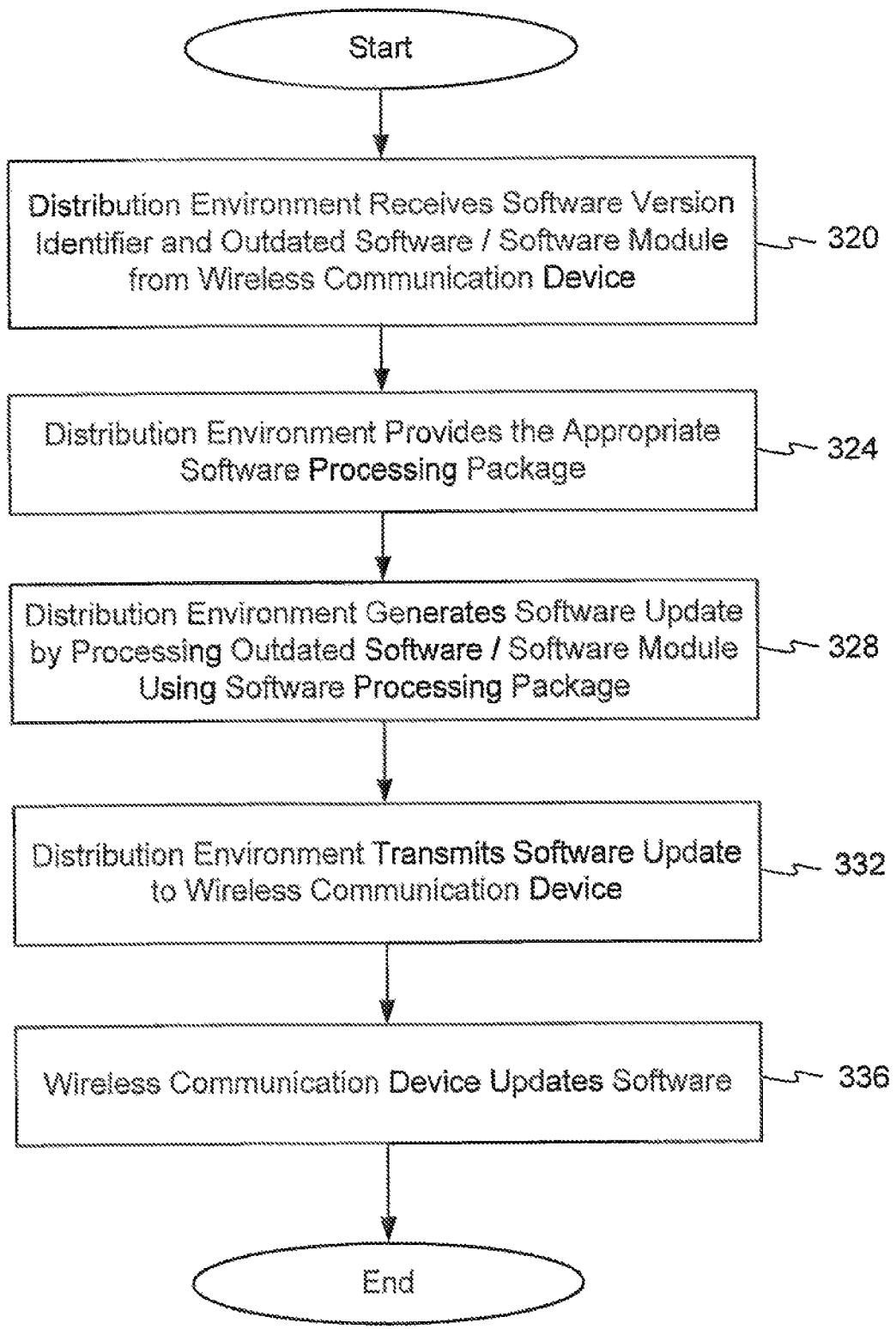
FIG. 3b is an operational flow diagram illustrating a method for updating software in a wireless communication device in accordance with an embodiment of the invention.

FIG. 3b is an operational flow diagram illustrating a method of updating software in a wireless communication device. At step 320, a distribution environment receives a software version identifier from the wireless communication device; additionally, the wireless communication device may supply portions of its existing software to be replaced, such as an exemplary outdated or obsolete software module. The software version identifier may be transmitted by the wireless communication device in response to a periodic request made by an exemplary server within the distribution environment. Based on the software version identifier, the distribution environment determines that a software update is not available for direct incorporation by the wireless communication device. The distribution environment may determine that the primary update environment may be inadequate for direct processing to occur by a software update. For example, the software version identifier may comprise information such as available memory space of the wireless communication device. The available memory space may be insufficient for any type of software update processing; and as a result, the distribution environment may perform the processing itself in conjunction with the primary update environment. At step 324, the distribution environment determines the appropriate software processing package based on the software processing package version identifier received. As a consequence, an appropriate software processing package is generated by a generator and delivered to the distribution environment. At step 328, the distribution environment generates one or more software updates by optionally processing the exemplary old software/old software module using the software processing package. At step 332, the distribution environment transmits the software update to the wireless communication device. And at step 336, the wireless communication device incorporates the software update into its existing software.

A download agent of the wireless communication device may transmit a software version identifier by way of an appropriate transport protocol. A transport protocol module may generate the appropriate transport protocol. It is contemplated that the appropriate transport protocol may be automatically selected by the transport protocol module based on factors such as software update size, available power in the wireless communication device, and airtime or service costs. It is contemplated that a particular transport protocol may be characterized by a particular power consumption. Further, the appropriate transport protocol may be determined by way of a customer preference profile input by a user into the wireless communication device. For example, the customer may program the transport protocol module of the wireless communication device to use a particular protocol based on the size of a software update.

In one embodiment, a download agent employs an upload agent to remove portions of existing software from non-volatile or volatile memory of a wireless communication device, in order to free up memory space for proper processing of downloaded software updates. Such removed portions of software may be selectively reinstated later, as necessary, in order to restore any functionality associated with the wireless communication device prior to an update process. The removed portions of software may be temporarily stored in volatile memory of the wireless communication device or remotely stored within other types of storage devices located within a distribution environment. In addition, a primary update environment may temporarily reshuffle portions of existing software between the non-volatile memory and the volatile memory in order to effectively process the software update during the software update process. In one embodiment, the primary update environment defragments the non-volatile memory of the wireless communication device prior to incorporating a software update.

In one embodiment, it is possible to revert back to an older version of software after an update to a newer version has been performed. It is contemplated that a distribution environment or a pre-processing device with memory may store one or more copies of a software image previously used in a wireless communication device. The software image may be used to revert the wireless communication device back to its previous software state. The software image may be re-written into memory to restore the software image to its previous state. This method may be employed when a wireless communication device is incompatible with a particular software update. In one embodiment, an upload agent of a primary update environment of a wireless communication device may upload a software or subset of software that is about to be updated. The upload agent may upload the software to be replaced into a storage device within the distribution environment or pre-processing device as a backup prior to downloading a software update. This may be beneficial when a particular configuration of a software version and/or its related application is considered valuable to a user.

Figure 4:
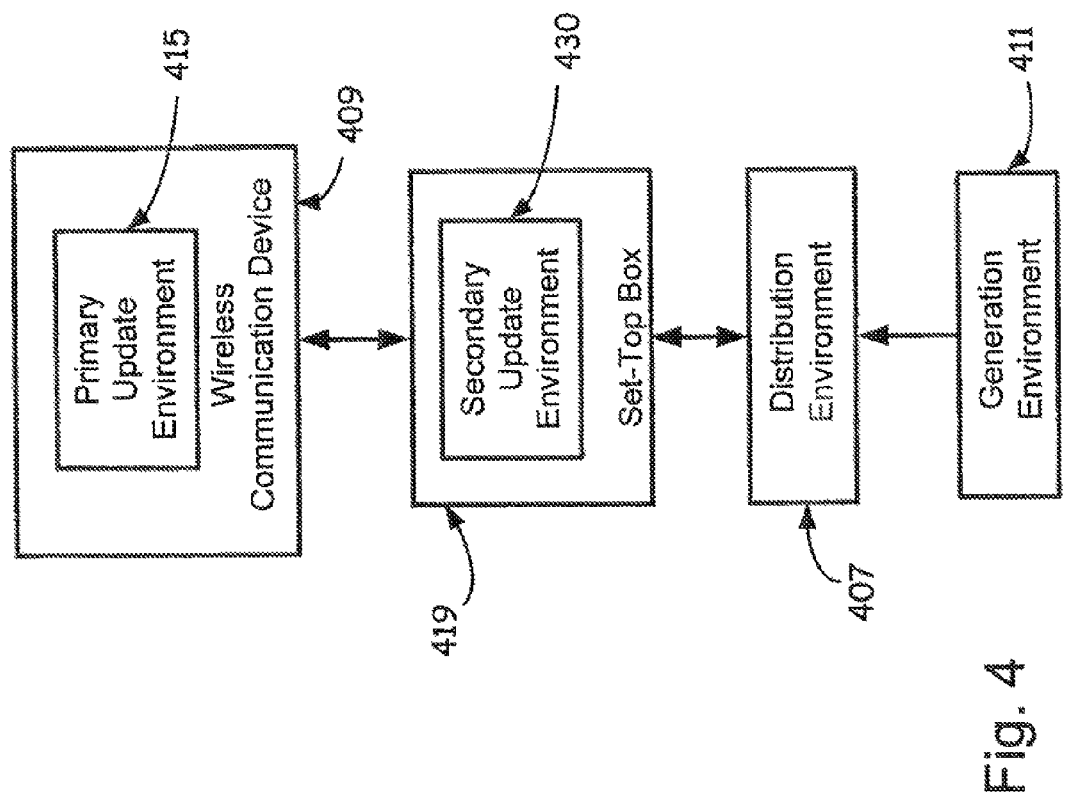
FIG. 4 is a block diagram of a system for updating software in a wireless communication device in accordance with an embodiment of the invention.

FIG. 4 is a block diagram of a system for updating software by way of software updates wherein a pre-processing device such as a set-top-box 419 (i.e., a cable TV based set-top-box) interfaces a distribution environment 407 to a wireless communication device 409. The set-top-box 419 may comprise any combination of hardware and/or software capable of communication and data transmission with one or more wireless or wireline networks. Typical wireless networks include 802.11, Bluetooth, CDMA, TDMA, GSM, and the like. Typical wireline networks include cable, dedicated line, DSL, and the like. The set-top-box 419 is used as a device to facilitate the download, storage, and use of a software update provided by the distribution environment to the wireless communication device 409. The distribution environment may comprise an exemplary cable TV network configured to store and disseminate software updates generated by a generation environment 411. It is contemplated that the set-top-box 419 provides an extension of the distribution environment in which a software update may be configured and/or stored for immediate use by the wireless communication device 409. As was previously described in FIG. 1, the wireless communication device 409 provides an update environment such a primary update environment to facilitate downloading and processing of software updates. To provide for a more efficient process, a secondary update environment 430 contained within the set-top-box 419 is implemented in the set-top-box 419 to facilitate downloading, processing, and storage of certain software from the distribution environment 407. The set-top-box 419 provides storage and processing of software in preparation for updating software resident in the wireless communication device 409. The generation environment 411 provides one or more software updates and/or software processing packages for storage in the distribution environment 407.

The generation environment 411 may comprise one or more computing devices and application software capable of generating one or more software updates and/or software processing packages for one or more types of wireless communication devices 409. It is contemplated that the generation environment 411 is owned and operated by an entity such as a carrier, wireless device manufacturer, software manufacturer, or value added reseller to provide support and service for all existing users of its wireless communication devices.

Although a set-top-box 419 is used as an embodiment to facilitate storage and processing of software updates and software processing packages, other types of devices may be adapted for this purpose. These devices may include cable-modem boxes, DSL modem boxes, or devices that wirelessly interact within a customer premise. For example, a television (TV) set communicating by way of a wireless adapter, over a local area air interface, may act as an end-point to interact with one or more wireless communication devices.

In one embodiment, a wireless communication device 409 requests a software update from a preprocessing device such as a set-top-box 419. The set-top-box 419 responds by transmitting a software update obtained from a distribution environment 407 based on parameters provided by the wireless communication device 409 to the set-top-box 419. It is contemplated the set-top-box 419 notifies the availability of the software update to the wireless communication device when the software update is received by the set-top-box 419 from the distribution environment 407. If previously requested by another wireless communication device, the set-top-box 419 may transmit a suitable software update from its own storage repository. Data transmission between the set-top-box 419 and the wireless communication device 409 occurs by way of several communication protocols such as 802.11a, 802.11b, IR, Bluetooth, and USB. In one embodiment, requests for software updates from the wireless communication device 409 are forwarded to the set-top-box 419. As a result, the set-top-box 419 downloads the appropriate software updates from one or more distribution environments 407, so that the wireless communication device 409 may subsequently download the software update for itself. The set-top-box 419 may provide a local repository in which associated wireless communication devices 409 may quickly and efficiently access any software updates. It is contemplated that the set-top-box 419 provides a local distribution and storage point for the dissemination of software updates to certain wireless communication devices 409. Consequently, the set-top-box 419 may retrieve certain software updates from the distribution environment 407 based on parameters, such as a software version identifier, supplied to it by one or more wireless communication devices 409. In this embodiment, the set-topbox 419 simply acts as a storage repository and convenient distribution point for certain wireless communication devices 409.

In one embodiment, the secondary update environment 430 is capable of generating a software update for a wireless communication device 409 by modifying an existing software module obtained from the wireless communication device 409. For example, the set-top-box 419 provides one or more software updates by reconfiguring an existing software module of the wireless communication device 409. It is contemplated that this is accomplished when the existing software module is operated on by software processing package. The software processing package may be provided by a generation environment 411 for storage and eventual processing that may occur in either a distribution environment 407 or a pre-processing device such as an exemplary set-top-box 419.

As illustrated in FIG. 4, a preprocessing device such as a set-top-box 419 provides a secondary update environment 430 while a wireless communication device 409 provides a primary update environment 415 in which to facilitate the downloading of software updates. In general, the addition of a secondary update environment 430 provides a supplementary means to provide software update processing and generation of software updates that a primary update environment 415 may be able to utilize. For example, a wireless communication device 409 may have insufficient memory space in which to process a software update. The secondary update environment 430 provides a pre-processing environment in which processing may be accomplished by way of sufficient memory space, to facilitate updating of software resident in the wireless communication device 409.

Figure 5:
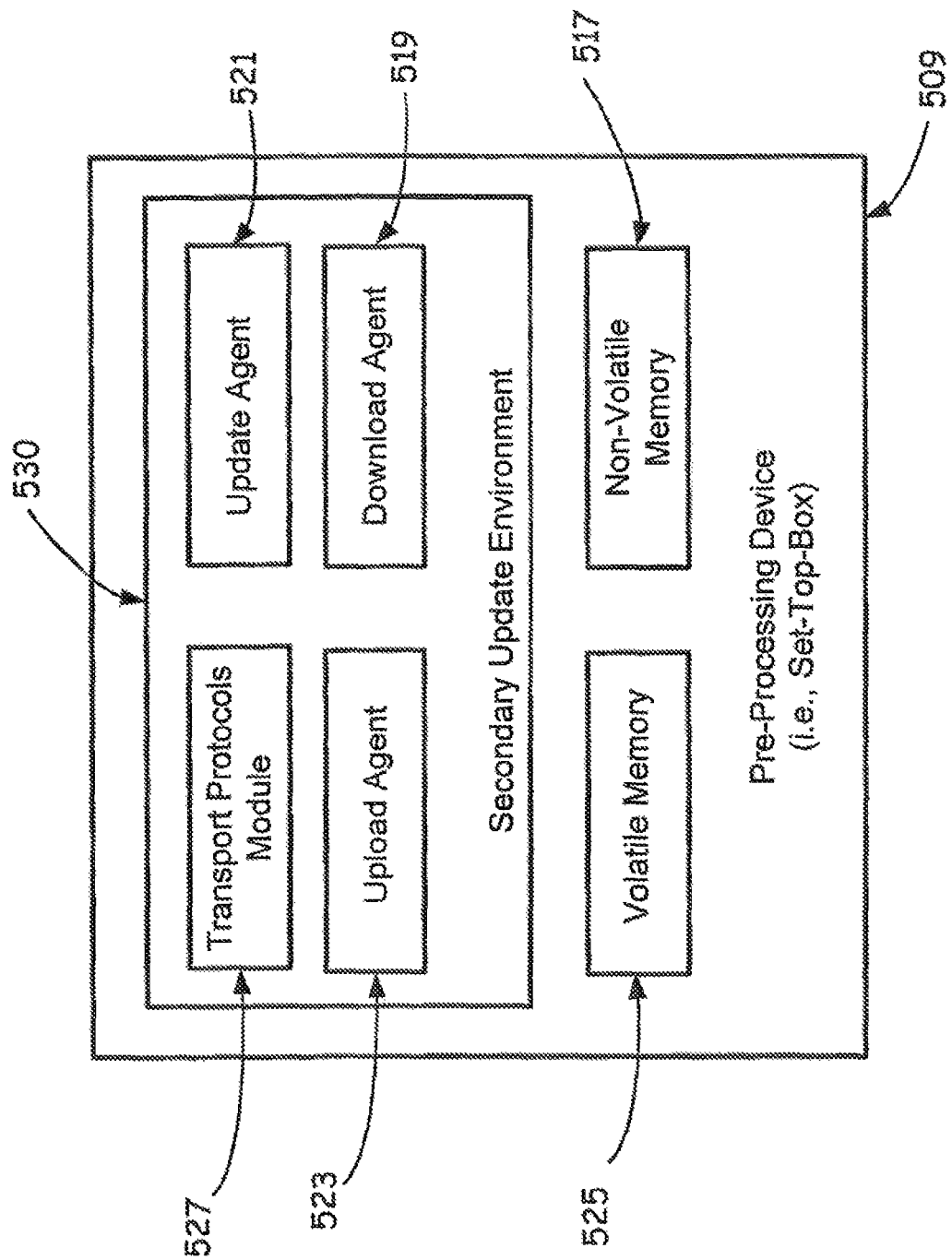
FIG. 5 is a block diagram of a subsystem for updating software in a wireless communication device in accordance with an embodiment of the invention.

FIG. 5 is a block diagram of a pre-processing device such as an exemplary set-top-box 509 comprising a secondary update environment 530, non-volatile memory 517, and volatile memory 525. The secondary update environment 530 comprises an update agent 521, a download agent 519, an upload agent 523 and a transport protocol module 527. The secondary update environment 530 employs the download agent 519 to retrieve one or more software updates or software processing packages from an external system such as a distribution environment. In one embodiment, the set-top-box 509 merely acts as a storage device for one or more software updates provided by the distribution environment. There may be a plurality of set-top-boxes 509 distributed throughout various nodes and/or end-points within the distribution environment. Of course, the software updates originate from a generation environment as previously discussed. Downloading of software updates may be initiated in response to software update messages generated from one or more wireless communication devices. The download agent 519 facilitates the download and incorporation of software provided by either a distribution environment or a wireless communication device. The upload agent 523 of the set-top-box 509 uploads software such as a software update to one or more wireless communication devices. The upload agent 523 facilitates the transfer of software into either one or more wireless communication devices. It is contemplated that the upload agent 523 may upload software received from the wireless communication device to a device such as a network server within the distribution environment. The distribution environment may perform processing that could not be accomplished at the set-top-box 509. In addition to being able to update its software, it is contemplated that the wireless communication device may be able to automatically update any application, driver, and other necessary software required for proper operation of the wireless communication device. The non-volatile and volatile memories 517, 525 may store and process one or more software processing packages provided by the distribution environment. In one embodiment, the software processing package may process one or more obsolete or outdated software/modules provided by one or more wireless communication devices. On occasion, it is contemplated that the wireless communication device may not have the memory capacity to perform processing that is provided by the pre-processing device such as the set-top-box 509. In this instance, the set-top-box 509 provides a convenient processing environment for processing the software processing package. The download, update, and upload agents 519, 521, 523 and transport protocol module 527 may comprise a combination of hardware and/or software. The secondary update environment 530 of the set-top-box 509 processes software that otherwise would have been performed at a primary update environment of a wireless communication device. The processing may include recompiling software code to provide a suitable software update for the wireless communication device.

The software update process commences when the wireless communication device transmits a request to the set-top-box 509. Thereafter, the wireless communication device may transmit to a download agent 519 of the set-top-box 509 a portion of existing software that requires updating. For example, it may transmit an outdated software module. The download agent 519 retrieves a software processing package from a distribution environment. The update agent 521 then processes the portion of existing software or software module by executing the software processing package. After processing is complete, the upload agent 523 of the set-top-box 509 uploads the software update into the wireless communication device by employing one of several available communication protocols provided by the transport protocol module 527. The transport protocol may be 802.11 or Bluetooth. It is contemplated that processing performed at the set-top-box 509 as opposed to that performed at a primary update environment of a wireless communication device expedites the software update process.

Figure 6A:
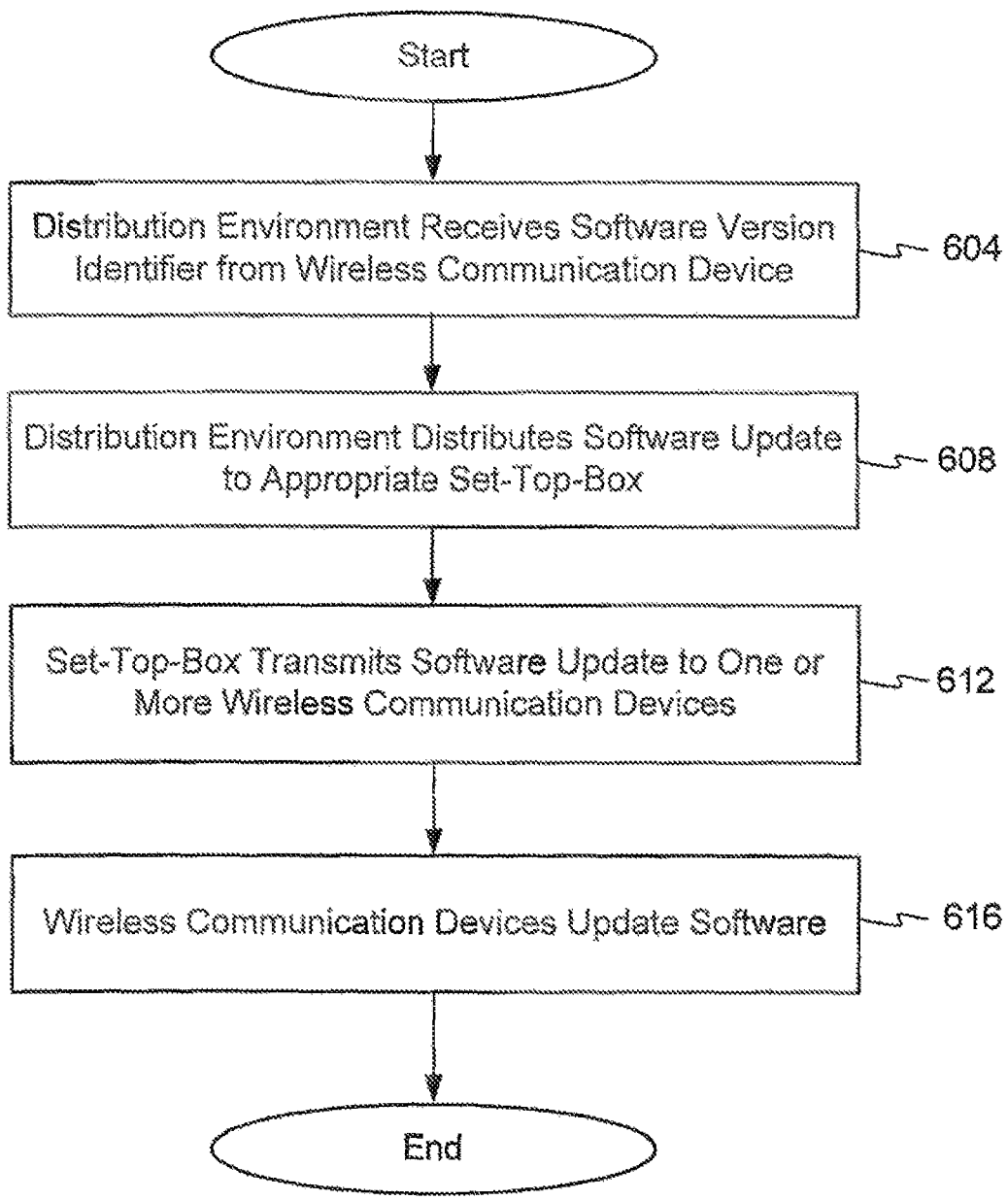
FIG. 6a is an operational flow diagram illustrating a method for updating software in a wireless communication device in accordance with an embodiment of the invention.

FIG. 6a is an operational flow diagram illustrating a method of updating software in wireless communication devices. At step 604, a distribution environment receives one or more software version identifiers from one or more wireless communication devices. The software version identifiers may be transmitted by the wireless communication devices by way of a pre-processing device such as a cable TV based set-top-box in response to a periodic request made by an exemplary server within the distribution environment. In other instances, one or more software version identifiers may be generated and transmitted by a user of the one or more wireless communication devices. At step 608, the distribution environment processes the one or more software version identifiers to provide one or more appropriate software updates for subsequent download to the set-top-box. A generation environment generates the appropriate software updates for storage at and distribution from the set-top-box. At step 612, the set-top-box transmits the appropriate software updates to the one or more wireless communication devices. And at step 616, the one or more wireless communication devices incorporate the desired software updates into the existing software of each of the one or more wireless communication devices. Download, update, and/or upload agents are utilized as required by the wireless communication devices.

Figure 6B:
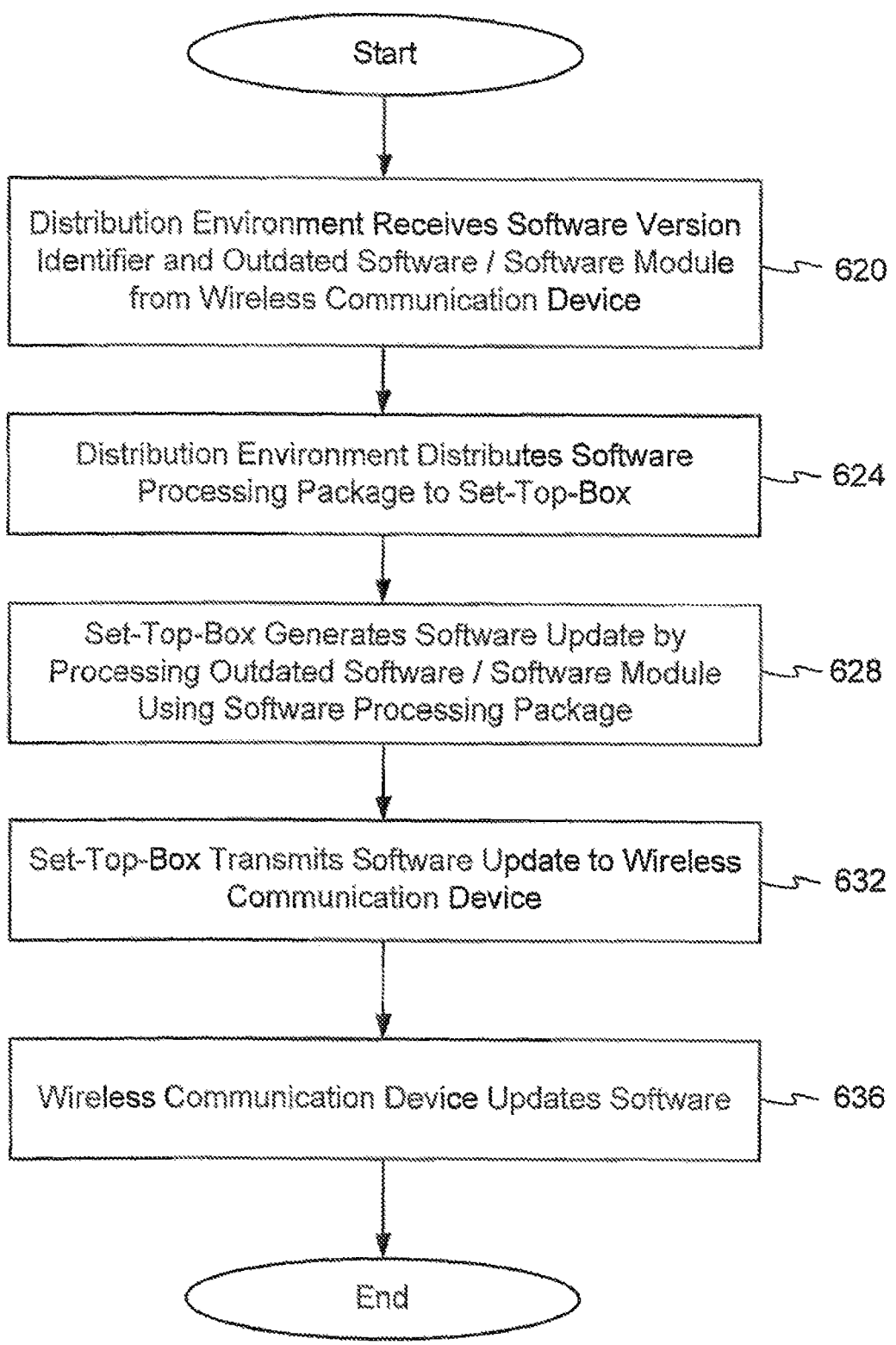
FIG. 6b is an operational flow diagram illustrating a method for updating software in a wireless communication device in accordance with an embodiment of the invention.

FIG. 6b is an operational flow diagram illustrating a method of updating software in a wireless communication device. The method incorporates the use of a pre-processing device such as a set-top-box. The set-top-box performs preprocessing of a software processing package to generate a software update for immediate use by the wireless communication device. At step 620, a distribution environment receives a software version identifier from the wireless communication device; optionally, the wireless communication device provides a copy of the software to be replaced, such as an outdated software module. The software version identifier may be transmitted by the wireless communication device in response to a periodic request made by an exemplary server within the distribution environment. At step 624, the distribution and generation environments facilitate the production of one or more appropriate software processing packages based on the software version identifier received. The software processing package is transmitted to a set-top-box where pre-processing occurs. The pre-processing may incorporate the outdated software provided by the wireless communication device. At step 628, the set-top-box generates a software update by optionally processing the outdated software/module using the software processing package. At step 632, the set-top-box transmits the software update to one or more wireless communication devices in its coverage area. At step 636, the wireless communication device incorporates the software update into its existing software.

Figure 7:
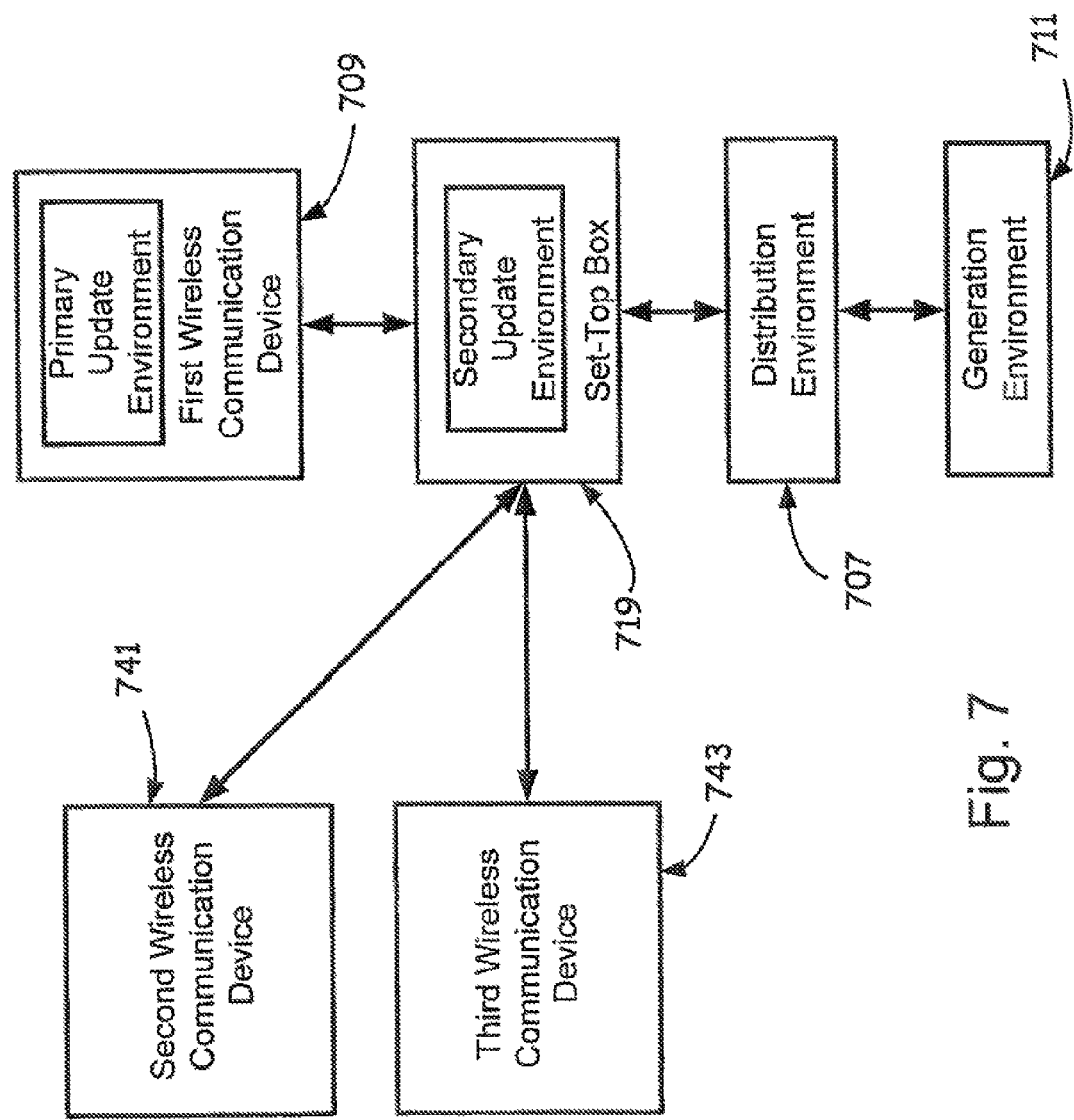
FIG. 7 is a block diagram of a system for updating software in a wireless communication device in accordance with an embodiment of the invention.

FIG. 7 is block diagram of a pre-processing device such as an exemplary set-top-box based network for updating software in one or more wireless communication devices in which first, second, and third wireless communication devices 709, 741, 743 obtain software updates from an exemplary set-top-box 719. Also illustrated is a generation environment 711 providing software updates and/or software processing packages to a distribution environment 707. In response to a request for a software update from the first wireless communication device 709, the second and third wireless communication devices 741, 743 may also simultaneously or subsequently request a software update. The set-top-box 719 may determine that the software update was previously generated for the wireless communication device 709. As a result, the set-top-box 719 may also forward the same software update to the second and third wireless communication devices 741 and 743 without performing any additional downloads of software updates and/or software processing packages. In this fashion, the set-top-box 719 tracks and stores information related to software updates and wireless communication devices it has communicated with. It is contemplated that the set-top-box 719 distributes one or more available software updates to all like wireless communication devices requiring one or more software updates in its communication range. This range, of course, may be dependent on the local air interface used. It is contemplated that the transmission occurs over air interfaces such as 802.11 or Bluetooth. Further, it is contemplated that any information related to a software update of any wireless communication device may be stored in memory of the set-top-box 719.

Figure 8:
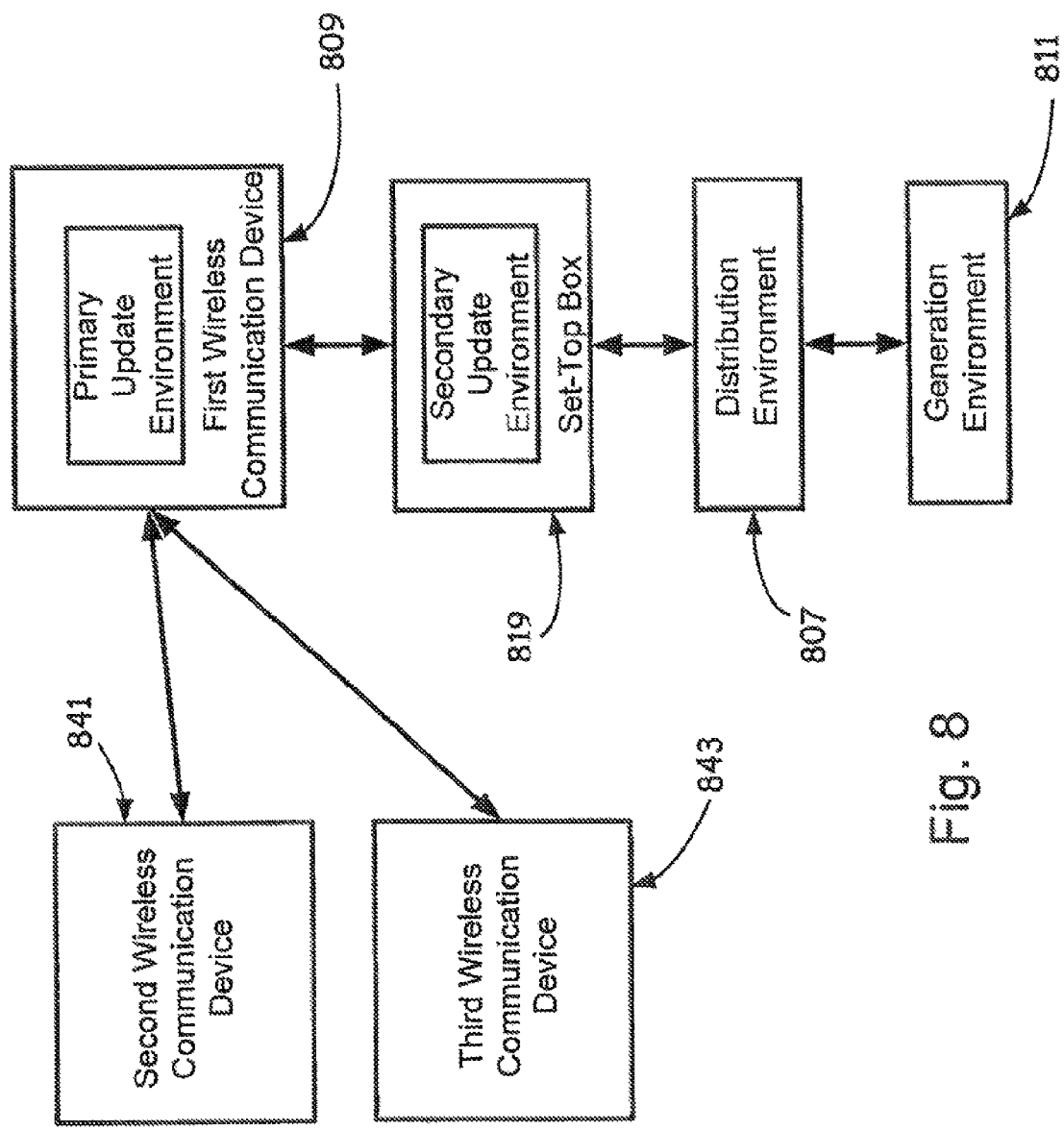
FIG. 8 is a block diagram of a system for updating software in a wireless communication device in accordance with an embodiment of the invention.

FIG. 8 is block diagram of pre-processing device such as an exemplary set-top-box based network for updating software in one or more wireless communication devices in which first, second, and third wireless communication devices 809, 841, 843 obtain software updates from an exemplary set-top-box 819. Also illustrated is a generation environment 811 providing software updates and/or software processing packages to a distribution environment 807. In this embodiment, the first, second, and third wireless communication devices 809, 841, 843 may request and obtain updated software from each other. For example, if the first wireless communication device 809 has already downloaded a certain software update, it may automatically distribute this software update to the second and third wireless communication devices 841, 843. It is contemplated that the transmission occurs over a wireless local area network such as 802.11 or Bluetooth. By using such wireless communication devices as additional distribution points, it is contemplated that it is possible to disseminate software updates over a much wider area. Again, it is contemplated that information related to any software update and wireless communication device may be stored in memory of the set-top-box 819.

In one embodiment, the set-top-box based network communicates with a carrier's billing and/or provisioning system when a software update occurs in a wireless communication device. The software update may be related to a service provided by the carrier. For example, a software update may feature one or more new applications that require the services of a carrier. When a software update occurs, a user may subscribe to one or more services by inputting one or more selections into the wireless communication device. Should the user select the one or more services, subscriber identification information associated with the wireless communication device may be transmitted directly from the wireless communication device or collected and stored in a set-top-box and/or distribution environment for eventual transmission to a carrier's billing/provisioning system. As a result, any new services may be provisioned and billed automatically by transmission of such subscriber information to a billing/provisioning system.

In one embodiment, a designated wireless communication device collects billing related information of other wireless communication devices in a localized area to which it has transmitted software updrafts. The wireless communication device periodically transfers the billing related information to the set-top-box for eventual transmission to the billing/provisioning system.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method of updating software in a wireless communication device, the method comprising:
   transmitting a software version identifier from said wireless communication device to a distribution environment, said software version identifier processed by said distribution environment to generate a software update for said wireless communication device;
   receiving a software update or a software processing package into a pre-processing device from said distribution environment;
   transmitting a software update from the pre-processing device to the wireless communication device by way of a local area network; and
   updating said wireless communication device with said software update.

2. The method of claim 1 wherein said distribution environment comprises a wide area network.

3. The method of claim 2 wherein said wide network comprises a cable TV network.

4. The method of claim 1 comprising processing performed by the pre-processing device.

5. The method of claim 4 wherein said pre-processing device comprises a set-top-box.

6. The method of claim 5 wherein said set-top-box notifies availability of said software update to said wireless communication device.

7. The method of claim 1 wherein said software update is generated by using a software processing package.

8. The method of claim 7 comprising processing a portion of software provided by said wireless communication device at said distribution environment.

9. The method of claim 7 comprising processing a portion of software provided by said wireless communication device at the pre-processing device.

10. The method of claim 1 comprising generating one or more update packages for storage in said distribution environment.

11. The method of claim 10 wherein said generating is performed by a generation environment.

12. The method of claim 4 comprising generating one or more update packages for storage in said pre-processing environment.

13. The method of claim 1 wherein said updating comprises:
    employing a download agent to download said software update; and
    employing an upload agent to remove a portion of existing software in said wireless communication device.

14. The method of claim 13 wherein said employing an upload agent to remove a portion of existing software frees up memory space.

15. The method of claim 13 wherein said removal of a portion of existing software may be selectively reinstated.

16. The method of claim 1 wherein said transmitting and said receiving is performed by way of a wireless air interface.

17. The method of claim 16 wherein said wireless air interface comprises one of the following: a short range wireless network compliant with network Bluetooth standard, an IEEE 802.11 wireless network, a GSM wireless network, a CDMA wireless network, and a TDMA wireless network.

18. The method of claim 16 wherein, based on one or more factors, said wireless air interface selects a transport protocol for updating the software.

19. The method of claim 18 wherein said one or more factors comprise available power of said wireless communication device, size of said software update, and airtime or service costs.

20. The method of claim 18 wherein said one or more factors are incorporated in a customer preference profile.

21. A method of distributing one or more software updates to a plurality of wireless communication devices, the method comprising:
    receiving, in a pre-processing device, at least a portion of software from at least one of the plurality of wireless communication devices;
    receiving, in the pre-processing device from a generation environment, the one or more software updates;
    pre-processing the at least a portion of software in the pre-processing device using the one or more software updates, the pre-processing producing updated software; and
    transmitting said one or more software updates from the pre-processing device to the at least one of the plurality of wireless communication devices using a wireless air interface.

22. The method of claim 21 wherein said air interface comprises one of the following: an IEEE 802.11 wireless network and a short range wireless network compliant with Bluetooth.

23. The method of claim 21 wherein said pre-processing device comprises a cable television set-top-box.

24. A method of backing up software of a wireless communication device, the method comprising:
    transmitting, over a wireless air interface, a portion of said software from memory in a wireless communication device of a user to a storage device in a distribution environment or a pre-processing device;
    determining that said portion of said software should be restored to said wireless communication device; and
    wirelessly receiving said portion of said software from said storage device and re-writing said portion of said software into said memory of said wireless communication device.

25. The method according to claim 24, wherein determining comprises:
    updating said software in said wireless communication device; and
    determining that said updated software is incompatible with said wireless communication device.

26. The method of claim 1 wherein the pre-processing device comprises a set-top box and wherein receiving comprises receiving the software processing package into the set-top box and the method further comprises:
    receiving an existing software module from the wireless communication device into the set-top box via the local area network;
    reconfiguring the existing software module using the software preprocessing package to produce the software update.

27. An apparatus, comprising:
    a wireless air interface;
    a memory device; and
    hardware coupled to the wireless air interface and to the memory device to execute software;
    wherein upon executing the software, the hardware receives into the memory device at least a portion of software from a wireless communication devices, receives an executable software processing package from a generation environment, executes the software processing package to reconfigure the at least a portion of software to generate reconfigured software, and transmits the reconfigured software to the wireless communication device via a wireless air interface.

* * * * *